US010942643B2

(12) United States Patent
Kuo

(10) Patent No.: US 10,942,643 B2
(45) Date of Patent: Mar. 9, 2021

(54) ACTIVE TOUCH PEN

(71) Applicant: Acer Incorporated, New Taipei (TW)

(72) Inventor: Jin-Ting Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/930,459

(22) Filed: May 13, 2020

(65) Prior Publication Data

US 2020/0272318 A1 Aug. 27, 2020

Related U.S. Application Data

(62) Division of application No. 15/957,931, filed on Apr. 20, 2018, now Pat. No. 10,698,602.

(30) Foreign Application Priority Data

Jan. 25, 2018 (TW) ................................. 107102602

(51) Int. Cl.
| *G06F 3/0354* | (2013.01) |
| *G06F 3/0488* | (2013.01) |
| *G06K 9/22* | (2006.01) |
| *G06F 3/038* | (2013.01) |
| *G06K 9/00* | (2006.01) |

(52) U.S. Cl.
CPC ........ *G06F 3/04883* (2013.01); *G06F 3/0383* (2013.01); *G06F 3/03545* (2013.01); *G06K 9/00355* (2013.01); *G06K 9/222* (2013.01); *G06F 2203/0384* (2013.01)

(58) Field of Classification Search
CPC ............... G06F 3/04883; G06F 3/0383; G06F 2203/0384; G06F 3/03545–03546; G06F 3/041–047; G06K 9/00355; G06K 9/222
See application file for complete search history.

(56) References Cited

U.S. PATENT DOCUMENTS

| 2003/0067453 | A1* | 4/2003 | Liu ....................... G06F 1/1626 345/179 |
| 2003/0090475 | A1 | 5/2003 | Paul et al. |
| 2008/0278443 | A1* | 11/2008 | Schelling .............. G06F 3/0338 345/157 |
| 2009/0135149 | A1* | 5/2009 | Taniuchi ............. G06F 3/03545 345/173 |

(Continued)

FOREIGN PATENT DOCUMENTS

| CN | 102591481 | 7/2012 |
| CN | 104142738 | 11/2014 |

*Primary Examiner* — Roberto W Flores
(74) *Attorney, Agent, or Firm* — JCIPRNET

(57) ABSTRACT

An active touch pen includes a pen barrel, a pen head, a pen shaft, a sleeve, a processor, a sensor and a wireless transmission assembly. The pen head is connected to the pen barrel. The pen shaft and the sleeve are respectively disposed in the pen barrel, and the pen shaft penetrates through the sleeve. The processor, the sensor and the wireless transmission assembly are respectively connected to the pen shaft. The sensor is configured to detect variation of a first pattern of the sleeve during the sleeve rotating relative to the pen barrel so as to obtain a first sensing data and transmits the first sensing data to the processor. The processor calculates rotation amount of the sleeve according to the first sensing data and transmits the rotation amount to the touch display device through the wireless transmission assembly.

4 Claims, 18 Drawing Sheets

(56) References Cited

U.S. PATENT DOCUMENTS

| | | | |
|---|---|---|---|
| 2009/0146975 A1* | 6/2009 | Chang | G06F 3/03545 345/179 |
| 2013/0335380 A1* | 12/2013 | Griffin | G06F 3/03545 345/179 |
| 2014/0029182 A1* | 1/2014 | Ashcraft | G06F 3/03545 361/679.4 |
| 2014/0218338 A1* | 8/2014 | Kim | G06F 3/046 345/174 |
| 2014/0306929 A1* | 10/2014 | Huang | G06F 3/03545 345/174 |
| 2014/0333588 A1* | 11/2014 | Lo | G06F 3/03545 345/179 |
| 2014/0347327 A1* | 11/2014 | Wu | G06F 3/039 345/179 |
| 2015/0116290 A1* | 4/2015 | Wheaton | B43K 29/08 345/179 |
| 2015/0205383 A1* | 7/2015 | Chang | G06F 3/041 345/179 |
| 2016/0162045 A1* | 6/2016 | Vincent | G06F 3/0383 345/179 |
| 2016/0267813 A1* | 9/2016 | Alsadah | G06F 3/014 |
| 2017/0052610 A1* | 2/2017 | Large | G06F 3/0485 |

\* cited by examiner

ACTIVE TOUCH PEN

CROSS-REFERENCE TO RELATED APPLICATION

This application is a divisional application of and claims the priority benefit of U.S. application Ser. No. 15/957,931, filed on Apr. 20, 2018, now allowed, which claims the priority benefit of Taiwan application serial no. 107102602, filed on Jan. 25, 2018. The entirety of each of the above-mentioned patent applications is hereby incorporated by reference herein and made a part of this specification.

BACKGROUND OF THE INVENTION

Field of the Invention

The invention relates to a touch pen and particularly relates to an active touch pen.

Description of Related Art

With the development of technology, common electronic devices, such as laptops, tablets, smartphones, or all-in-one desktops (AIO) have become indispensable tools for modern people. In addition, with the development of touch display technology, touch display screens have gradually become the standard specification of the said electronic devices, such that users can manipulate the said electronic devices through touching touch display screens.

To precisely control touch points on the touch display screen, a touch pen is thus proposed. For example, a user can touch the touch display screen through a touch pen, and slide the touch pen on the touch display screen so as to match with software in the touch display device for movements such as writing, drawing, and so on. While writing or drawing, the user can perform toning or select color through the cooperation of a toning turntable and the software. The theory is as follows: First, the toning turntable is contacted with the touch display screen. Then, the toning turntable is rotated and acquires different images through an imaging capturing element, and calculates the rotation amount of the toning turntable through the aforementioned image. Lastly, a corresponding color is selected or adjusted according to the rotation amount of the toning turntable. However, the toning turntable exists the disadvantage of inconvenience of carrying.

SUMMARY OF THE INVENTION

The invention provides an active touch pen with excellent ease of use.

The active touch pen of the invention is used for manipulating a touch display device. The active touch pen includes a pen barrel, a pen head, a pen shaft, a sleeve, a processor, a sensor and a wireless transmission assembly. The pen head is connected to the pen barrel. The pen shaft and the sleeve are respectively disposed in the pen barrel. The pen shaft penetrates through the sleeve, wherein the sleeve has an inner surface surrounding the pen shaft and a bottom surface facing the pen head, and the inner surface or the bottom surface of the sleeve has a first pattern. The processor, the sensor and the wireless transmission assembly are respectively connected to the pen shaft, and the sensor and the wireless transmission assembly are respectively electrically connected to the processor. The sensor is configured to detect variation of the first pattern during the sleeve rotating relative to the pen barrel so as to obtain a first sensing data and transmits the first sensing data to the processor. The processor calculates rotation amount of the sleeve according to the first sensing data and transmits the rotation amount to the touch display device through the wireless transmission assembly to perform toning.

Based on the above, a toning mechanism is integrated in the active touch pen of the invention. With the assistance of the sensor, the processor, and the wireless transmission assembly, the user only needs to rotate the sleeve so as to interact with the software in the touch display device, and perform toning in the touch display device. Therefore, the active touch pen of the invention has great ease of use.

To provide a further understanding of the aforementioned and other features and advantages of the disclosure, exemplary embodiments, together with the reference drawings, are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

FIG. 1I is a schematic view of a toning screen of a touch display device of the first embodiment of the invention.

DESCRIPTION OF THE EMBODIMENTS

Figure 1A:
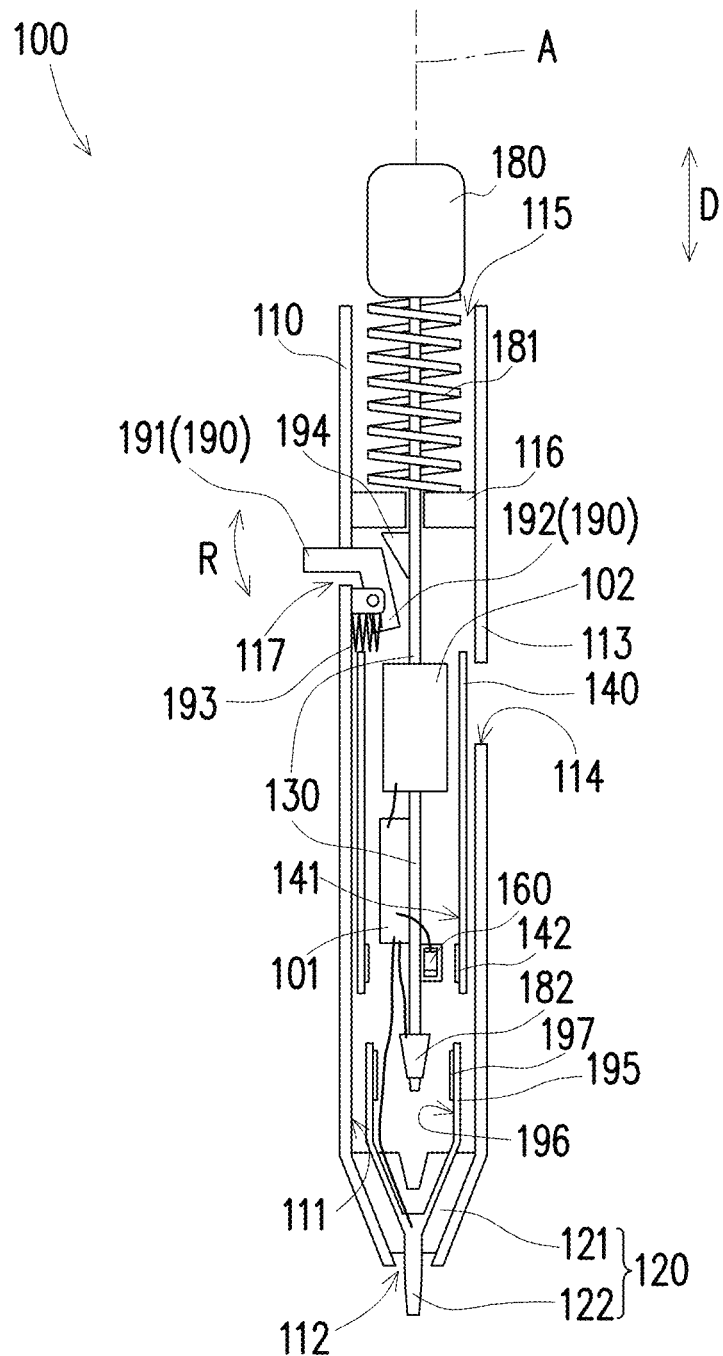
FIG. 1A is a structural schematic view of an active touch pen of the first embodiment of the invention under a first state.
Figure 1B:
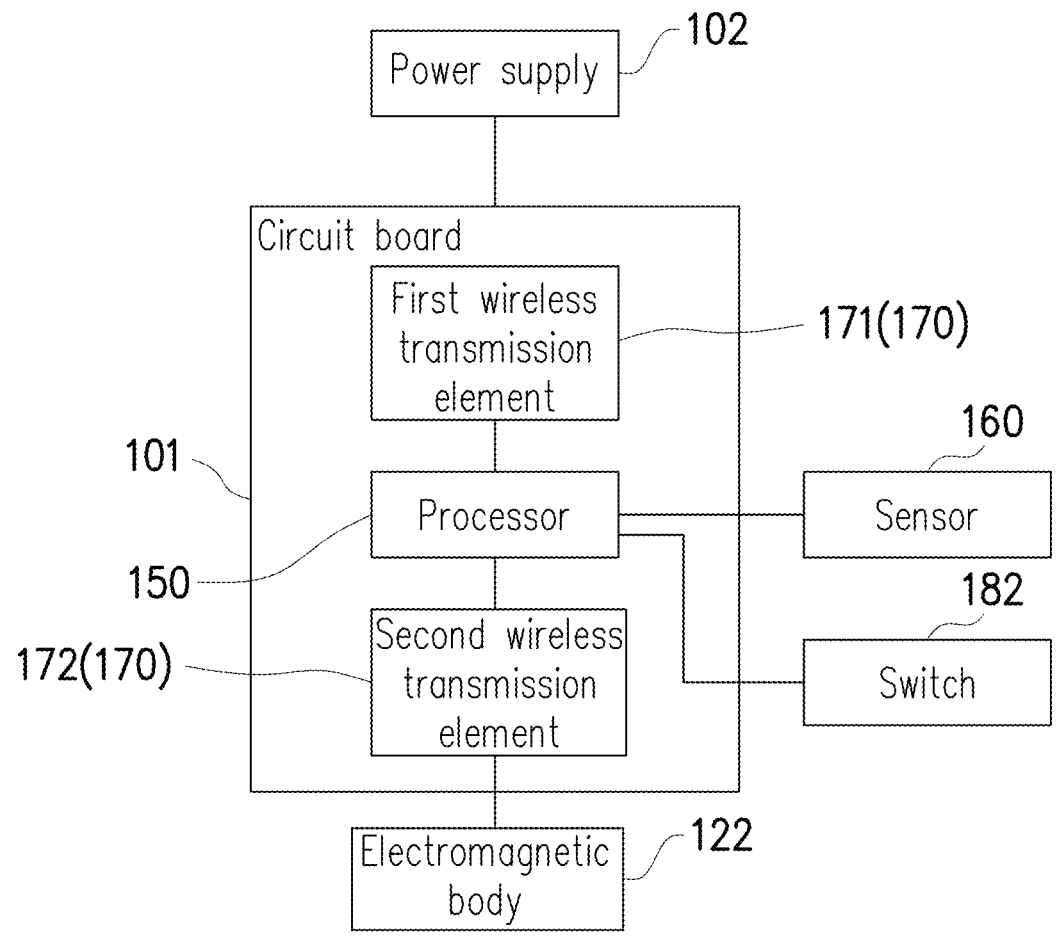
FIG. 1B is a circuit diagram of an active touch pen of the first embodiment of the invention.
Figure 1C:
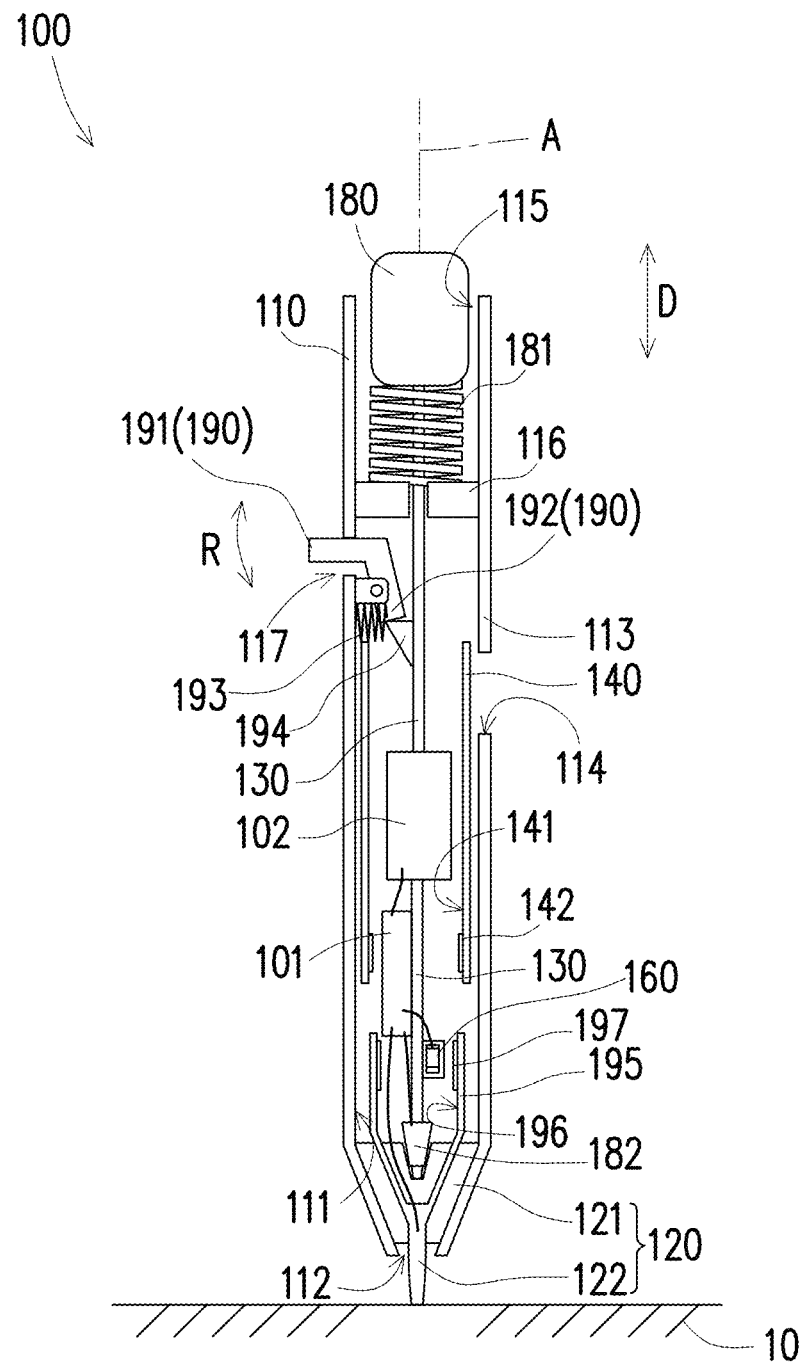
FIG. 1C is a structural schematic view of an active touch pen of the first embodiment of the invention under a second state.
Figure 1D:
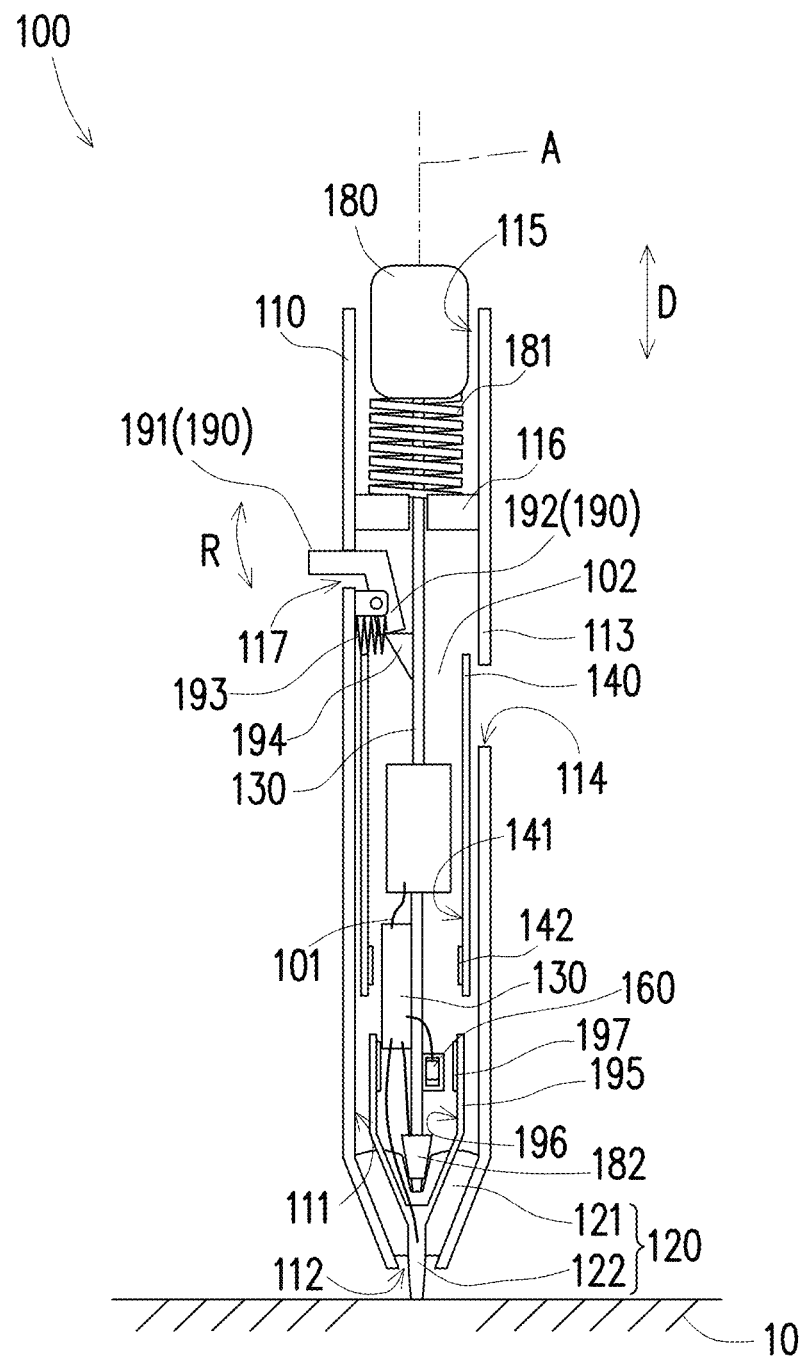
FIG. 1D is a structural schematic view of a pen head of FIG. 1B after being pressed.
Figure 1E:
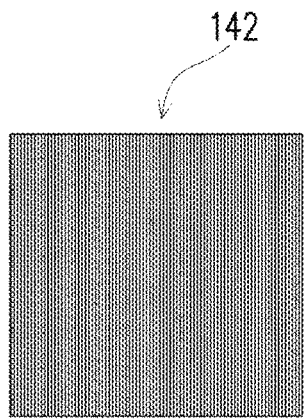
FIG. 1E is a schematic view of a first pattern in a sleeve of FIG. 1A.
Figure 1F:
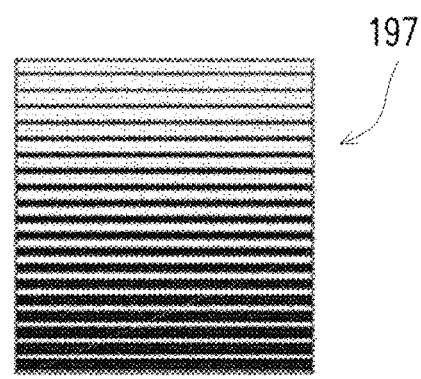
FIG. 1F to FIG. 1H are schematic views of a second pattern in a linking component of FIG. 1A respectively.
Figure 1G:
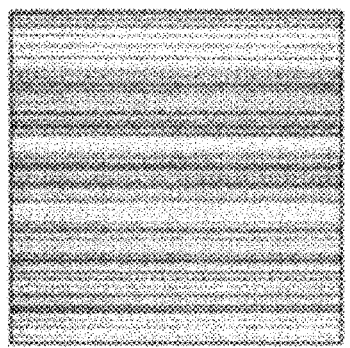
Figure 1H:
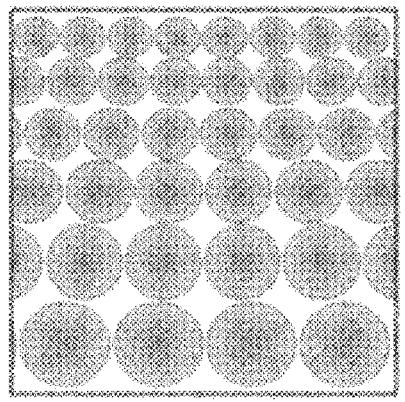
Figure 11:
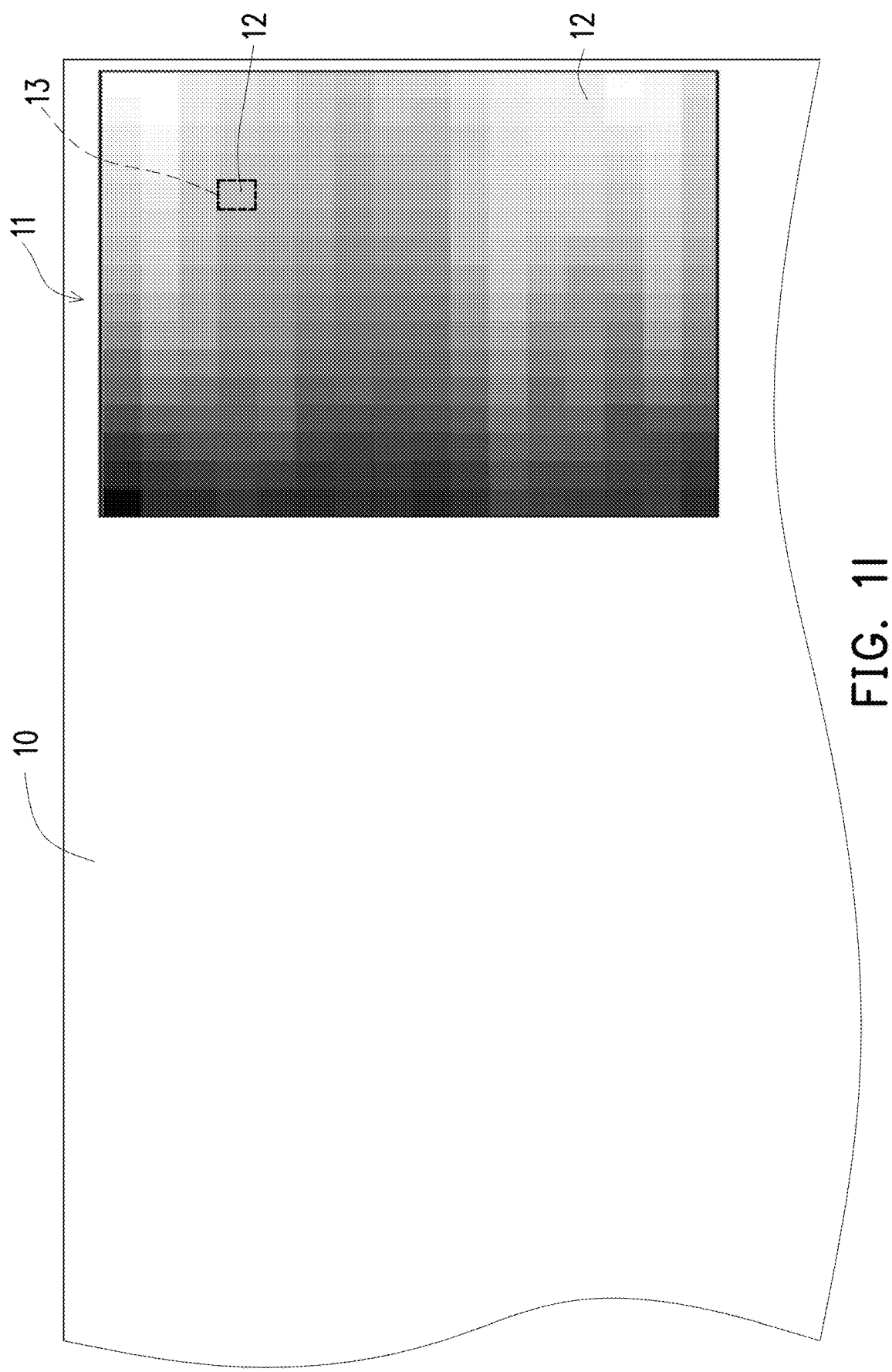

FIG. 1A is a structural schematic view of an active touch pen of the first embodiment of the invention under a first state. FIG. 1B is a circuit diagram of an active touch pen of the first embodiment of the invention. FIG. 1C is a structural schematic view of an active touch pen of the first embodiment of the invention under a second state. FIG. 1D is a structural schematic view of a pen head of FIG. 1B after being pressed. FIG. 1E is a schematic view of a first pattern in a sleeve of FIG. 1A. FIG. 1F to FIG. 1H are schematic views of a second pattern in a linking component of FIG. 1A respectively. FIG. 1I is a schematic view of a toning screen of the touch display device of the embodiment of the invention. Firstly, please refer to FIG. 1A and FIG. 1B, in this embodiment, an active touch pen 100 is used for manipulating a touch display device 10. For example, a user can touch the touch display device 10 through the active touch pen 100, and slide the active touch pen 100 on the touch display device 10 so as to match with software in the touch display device 10 for movements such as writing, drawing, and so on. In addition, since a toning mechanism is integrated in the active touch pen 100 of the embodiment, the user does not need to purchase an additional toning turntable. This only saves the trouble of carrying, but also greatly enhances ease of use.

The active touch pen 100 includes a pen barrel 110, a pen head 120, a pen shaft 130, a sleeve 140, a processor 150, a sensor 160, and a wireless transmission assembly 170, wherein the pen barrel 110 is a hollow structure, and is configured to accommodate at least a part of the pen head 120, the pen shaft 130, the sleeve 140, the processor 150, the sensor 160, and the wireless transmission assembly 170. Specifically, the pen head 120 is connected to the pen barrel 110, wherein the pen head 120 includes an elastomer 121 and an electromagnetic body 122 connected to the elastomer 121, and the elastomer 121 is disposed in the pen barrel 110. The elastomer 121 can be made of silicon, rubber, or other deformable insulating materials, and is connected to an inner surface 111 of the pen barrel 110. One part of the electromagnetic body 122 is embedded in the elastomer 121. Yet, the other part of the electromagnetic body 122 penetrates from a first opening 112 of the pen barrel 110, and is thus exposed outside the pen barrel 110, used to touch the touch display device 10, and slide on the touch display device 10 to match movements such as writing or drawing, and so on, in the software of the touch display device 10.

The pen shaft 130 and the sleeve 140 are respectively disposed in the pen barrel 110, wherein the pen shaft 130 has the degree of freedom for moving back and forth along a moving direction D relative to the pen barrel 110, and the sleeve 140 has the degree of freedom for rotating back and forth with respect to the Axis A relative to the pen barrel 110. The Axis A can be parallel to the extension direction of the pen shaft 130. For example, the outer surface of the sleeve 140 is opposite to the inner surface 111 of the pen barrel 110, and guiding structures fitting with each other are respectively disposed on the outer surface of the sleeve 140 and the inner surface 111 of the pen barrel 110, used for enhancing the reliability and stability when the sleeve 140 rotates relative to the pen barrel 110. On the other hand, the sleeve 140 is a hollow structure, and the pen shaft 130 penetrates through the sleeve 140. The pen barrel 110 has a second opening 114 penetrating a sidewall 113, and at least a part of the sleeve 140 is exposed outside the second opening 114. As such, the user can apply force on the part of the sleeve 140 exposed outside the second opening 114 so as to make the sleeve 140 rotate back and forth with respect to the axis A relative to the pen barrel 110.

The processor 150, the sensor 160, and the wireless transmission assembly 170 are respectively disposed in the pen barrel 110, and are respectively connected to the pen shaft 130. That is, during the pen shaft 130 moving back and forth along the moving direction D relative to the pen barrel 110, the processor 150, the sensor 160, and the wireless transmission assembly 170 all move along with the pen shaft 130. Furthermore, the active touch pen 100 further includes a circuit board 101 fixed on the pen shaft 130. The processor 150 and the wireless transmission assembly 170 are respectively disposed on the circuit board 101. That is, the processor 150 and the wireless transmission assembly 170 are respectively connected to the pen shaft 130 through the circuit board 101. On the other hand, the processor 150 and the wireless transmission assembly 170 are electrically connected to each other through the circuit board 101. In addition, the processor 150 is, for example, a central processing unit (CPU), a system on chip (SOC), or other programmable microprocessor for general use or for common use, a digital signal processor (DSP), a programmable controller, an application specific integrated circuits (ASIC), a programmable logic device (PLD), or other similar processing devices or the combination of the devices.

The sensor 160 can be a light sensor (including a light emitter and a light receiver), and is electrically connected to the processor 150. For example, the sensor 160 is electrically connected to the circuit board 101 through a corresponding trace, and is electrically connected to the processor 150 through the circuit board 101. On the other hand, the wireless transmission assembly 170 includes a first wireless transmission element 171 and a second wireless transmission element 172, wherein the first wireless transmission element 171 can be a Bluetooth transceiver, and is configured to transmit signals to the touch display device 10, or receive signals from the touch display device 10. In other embodiments, ways of wireless signal connection of the first wireless transmission element can be selected from one of the wireless communication protocols of IR, 3G, 4G, Wi-Fi, WLAN, ZigBee, Z-wave, NFC, 5G, LoRa, Enocean, 6Low-Pan, and RFID, or the combination thereof. However, the invention is not limited thereto. The second wireless transmission element 172 can be an electromagnetic transmission element, and is electrically connected to the electromagnetic body 122 through the circuit board 101 and the corresponding trace. The processor 150 can control the second wireless transmission element 172 sending electromagnetic signals, and transmit electromagnetic signals to the touch display device 10 through the electromagnetic body 122 so as to interact with the touch display device 10.

In this embodiment, the active touch pen 100 further includes a power supply 102, such as a battery fixed on the pen shaft 130. The power supply 102 is electrically connected to the circuit board 101 through the corresponding trace, and provides required electricity to the processor 150, the sensor 160, and the wireless transmission assembly 170 during operation through the circuit board 101.

Please refer to FIG. 1A to FIG. 1C. In this embodiment, the active touch pen 100 further includes a pressing component 180, a first elastic component 181, and a switch 182, wherein the pressing component 180 and the pen head 120 are respectively located at two opposite sides of the pen barrel 110, and the pressing component 180 and the switch 182 are respectively connected to two opposite ends of the pen shaft 130. At least a part of the pressing component 180 penetrates from a third opening 115 of the pen barrel 110 and is exposed outside the pen barrel 110, wherein the first opening 112 and the third opening 115 are opposite to each other, and are respectively located at two opposite sides of the second opening 114.

The first elastic component 181 is, for example, a compressed spring, and is disposed in the pen barrel 110. The pen barrel 110 is configured with a block portion 116 protruding from the inner surface 111, and the first elastic component 181 is located between the pressing component 180 and the block portion 116. Two opposite ends of the first elastic component 181 are respectively connected to the pressing component 180 and the block portion 116, and the pen shaft 130 penetrates through the first elastic component 181. The switch 182 can be a pressing switch or a touch switch, wherein the switch 182 is fixed on one end of the pen shaft 130 facing the elastomer 121, and is located between the pen shaft 130 and the pen head 120. The switch 182 is electrically connected to the processor 150. For example, the switch 182 is electrically connected to the circuit board 101 through the corresponding trace, and is electrically connected to the processor 150 through the circuit board 101.

In this embodiment, the active touch pen 100 further includes a first restraint component 190, a second elastic component 193, and a second restraint component 194, wherein the first restraint component 190 is connected to the pen barrel 110, and has the degree of freedom for moving back and forth along a rotating direction R relative to the pen barrel 110. The first restraint component 190 and the first elastic component 181 are respectively located at two opposite sides of the block portion 116. The first restraint component 190 has a control portion 191 and a restraint portion 192 opposite to the control portion 191, wherein the control portion 191 penetrates from a fourth opening 117 of the pen barrel 110 and is exposed outside the pen barrel 110. Besides, the restraint portion 192 is located in the pen barrel 110. In addition, the first opening 112 and the third opening 115 are respectively located at two opposite sides of the fourth opening 117.

On the other hand, the second elastic component 193 is disposed in the pen barrel 110, and two opposite ends of the second elastic component 193 are respectively connected to the inner surface 111 of the pen barrel 110 and the restraint portion 192. The pivot point of the first restraint component 190 and the pen barrel 110 is, for example, located in the pen barrel 110, and is located between the block portion 116 and the second elastic component 193. Furthermore, the back and forth rotation of the first restraint component 190 may lead to elastic deformation of the second elastic component 193. However, an elastic restoring force of the second elastic component 193 is used to drive the first restraint component 190 rotating to reset. The second restraint component 194 is connected to the pen shaft 130, and is configured to move along with the pen shaft 130 relative to the pen barrel 110. Under the first state illustrated in FIG. 1A, the first elastic component 181 is not deformed, wherein the second restraint component 194 gets close to the block portion 116, and is, for example, located between the block portion 116 and the restraint portion 192 of the first restraint component 190.

When the pressing component 180 is pressed, and the pen shaft 130 thus moves toward the pen head 120 relative to the pen barrel 110, the second restraint component 194 moves away from the block portion 116, and moves through the restraint portion 192. Furthermore, the restraint portion 192 is pushed by the second restraint component 194, such that the first restraint component 190 rotates, and that the second elastic component 193 is pushed by the restraint portion 192 and produces elastic deformation. After the second restraint component 194 moves through the restraint portion 192, the elastic restoring force of the second elastic component 193 drives the first restraint component 190 rotating to reset, such that the second restraint component 194 is abutted against the restraint portion 192. At this time, the active touch pen 100 is converted to the second state illustrated in FIG. 1C, wherein the first elastic component 181 is pushed by the pressing component 180 and produces elastic deformation. Also, the block portion 116 and the second restraint component 194 are respectively located at two opposite sides of the first restraint component 190. Since the second restraint component 194 and the restraint portion 192 are abutted against each other, the active touch pen 100 maintains the second state illustrated in FIG. 1C.

It should be noted that the user can rotate the first restraint component 190 through the control portion 191 so as to remove structure interference between the second restraint component 194 and the restraint portion 192. After the structure interference of the second restraint component 194 and the restraint portion 192 is removed, the elastic restoring force of the first elastic component 181 is applied on the pressing component 180 and the pen shaft 130 is driven to move relative to the pen barrel 110, such that the active touch pen 100 returns from the second state illustrated in FIG. 1C to the first state illustrated in FIG. 1A.

Please refer to FIG. 1A to 1C, FIG. 1F and FIG. 1I. In this embodiment, the sleeve 140 has an inner surface 141 surrounding the pen shaft 130, and the inner surface 141 has a first pattern 142 illustrated in FIG. 1E. It should be noted that FIG. 1E schematically illustrates a part of the first pattern 142 after expansion. In fact, the first pattern 142 is at least distributed on a region of the inner surface 141 of the sleeve 140 aligned with the sensor 160. On the other hand, the first pattern 142 can be consisted of a plurality of stripes arranged in parallel or arranged alternatively, wherein the extension direction of every stripe is substantially parallel to the extension direction of the pen shaft 130, and the arrangement direction of these stripes are substantially the same as the rotation direction of the sleeve 140 (the direction of the sleeve 140 rotating relative to the pen barrel 110 with respect to the Axis A).

Under the first state illustrated in FIG. 1A, the sensor 160 is located in the sleeve 140, and is aligned with the first pattern 142. At this time, the user can apply force to the part of the sleeve 140 exposed outside the second opening 114, such that the sleeve 140 rotates with respect to the Axis A relative to the pen barrel 110. When the sleeve 140 rotates with respect to the Axis A relative to the pen barrel 110, the fixed sensor 160 is used to detect variation of the first pattern 142 so as to obtain a first sensing data and transmits the first sensing data to the processor 150. After the processor 150 receives the first sensing data, the processor 150 calculates rotation amount of the sleeve 140 according to the first sensing data and transmits the rotation amount to the touch display device 10 through the first wireless transmission element 171 so as to match with the software in the touch display device 10 to perform toning, as illustrated in FIG. 1I. Furthermore, a color picker 11 can be shown on the touch display device 10 including a plurality of color blocks 12, according to the rotation direction and amount of rotation of the sleeve 140, the location of a circle box 13, used to select the color block 12, in the color picker 11, moves along. After the user selects the color block 12, the sleeve 140 stops rotating.

Then, the active touch pen 100 is converted to the second state illustrated in FIG. 1C. During this process, the pen shaft 130 moves toward the pen head 120 relative to the pen barrel 110, and the switch 182 fixed on the pen shaft 130 abuts against the elastomer 121 of the pen head 120. After the switch 182 is triggered, the switch 182 transmits signals to the processor 150. Based on the said signals, the processor 150 transmit signals to the touch display device 10 through the first wireless transmission element 171 so as to make the circle box 13 stop at the color block 12 selected by the user. Then, the user can touch the touch display device 10 through the electromagnetic body 122, and slide on the touch display device 10 so as to match with the software in the touch display device 10 for writing or drawing according to the selected color.

In this embodiment, the active touch pen 100 further includes a linking component 195, wherein the linking component 195 is connected to the elastomer 121 of the pen head 120, and is located in the pen barrel 110. The linking component 195 extends from the pen head 120 toward the sleeve 140, and is located at least one side of the pen shaft 130 or surrounding the pen shaft 130. An inner surface 196 of the linking component 195 facing the pen shaft 130 has a second pattern 197. It should be noted that FIG. 1F schematically illustrates part of the second pattern 197 after expansion. In fact, the second pattern 197 is at least distributed on a region of the inner surface 196 of the linking component 195 aligned with the sensor 160. On the other hand, the second pattern 197 is composed of a plurality of stripes arranged in parallel or arranged alternatively, wherein the extension direction of every stripe is substantially parallel to the extension direction of the pen shaft 130 or the moving direction D, and the arrangement directions of these stripes are substantially parallel to the extension direction of the pen shaft 130 or the moving direction D. In other embodiments, the second pattern can be illustrated as in FIG. 1G or FIG. 1H. However, the invention is not limited thereto.

Please refer to FIG. 1A, FIG. 1C, and FIG. 1D, under the second state illustrated in FIG. 1C, the sensor 160 moves toward one side of the linking component 195, wherein the sensor 160 faces the inner surface 196 of the linking component 195, and is aligned with the second pattern 197. When the user writes or draws in the touch display device 10 through the active touch pen 100, the pressed-down pressure makes the elastomer 121 deform, such that the linking component 195 moves relative to the pen barrel 110. During the process of the linking component 195 moving along with the pen head 120 relative to the pen barrel 110, the sensor 160 detects the variation of the second pattern 197 so as to obtain a second sensing data. The processor 150 calculates the pressure value when the pen head is pressed according to the second sensing data, and transmits to the touch display device 10 through the wireless transmission assembly 170 to dynamically adjust thickness of lines when writing or drawing according to the pressure pressed down by the user.

Other embodiments are listed below for explanation. It should be noted that the embodiments below follow the reference numerals and parts of the aforementioned embodiments, wherein the same reference numerals are used for the same or similar elements, and explanations for the same technical contents are omitted. For the descriptions of the omitted parts, reference may be made to the foregoing embodiment, and will not be repeated in the following embodiments.

Figure 2A:
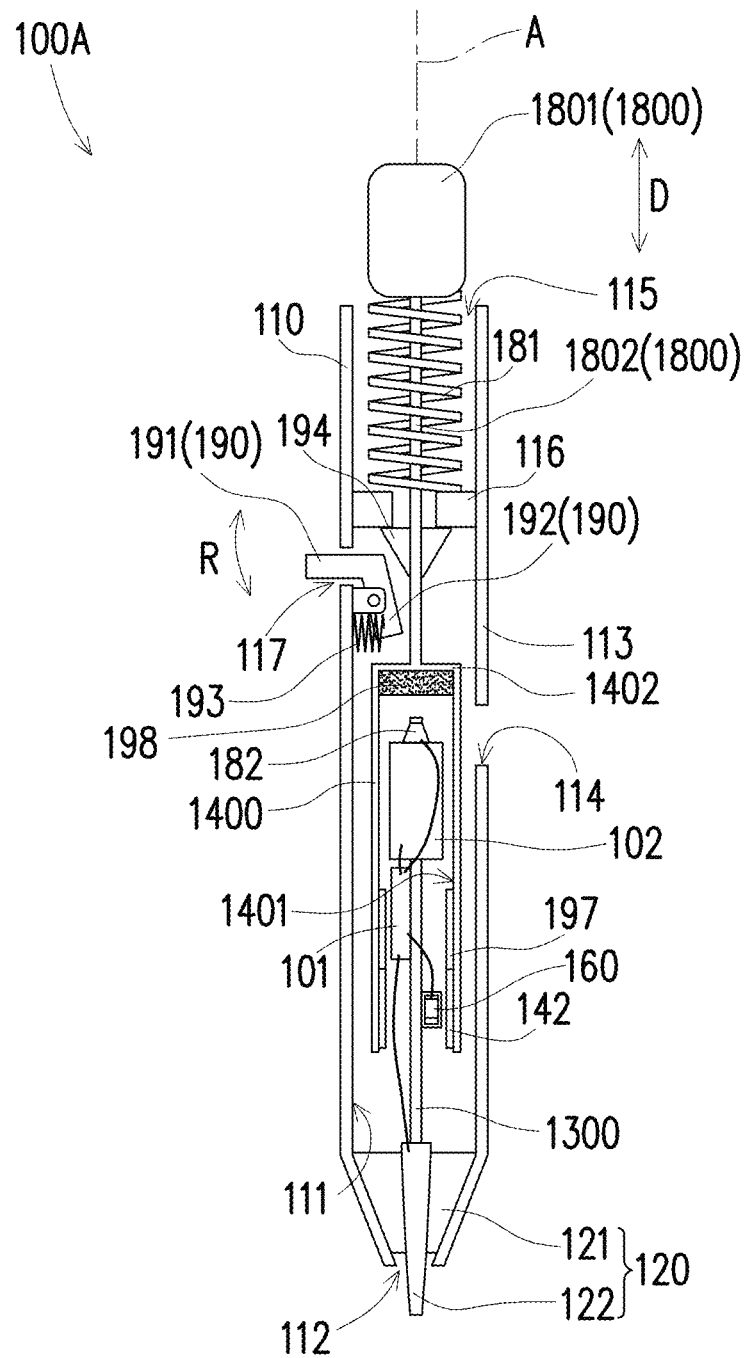
FIG. 2A is a structural schematic view of an active touch pen of the second embodiment of the invention under a first state.
Figure 2B:
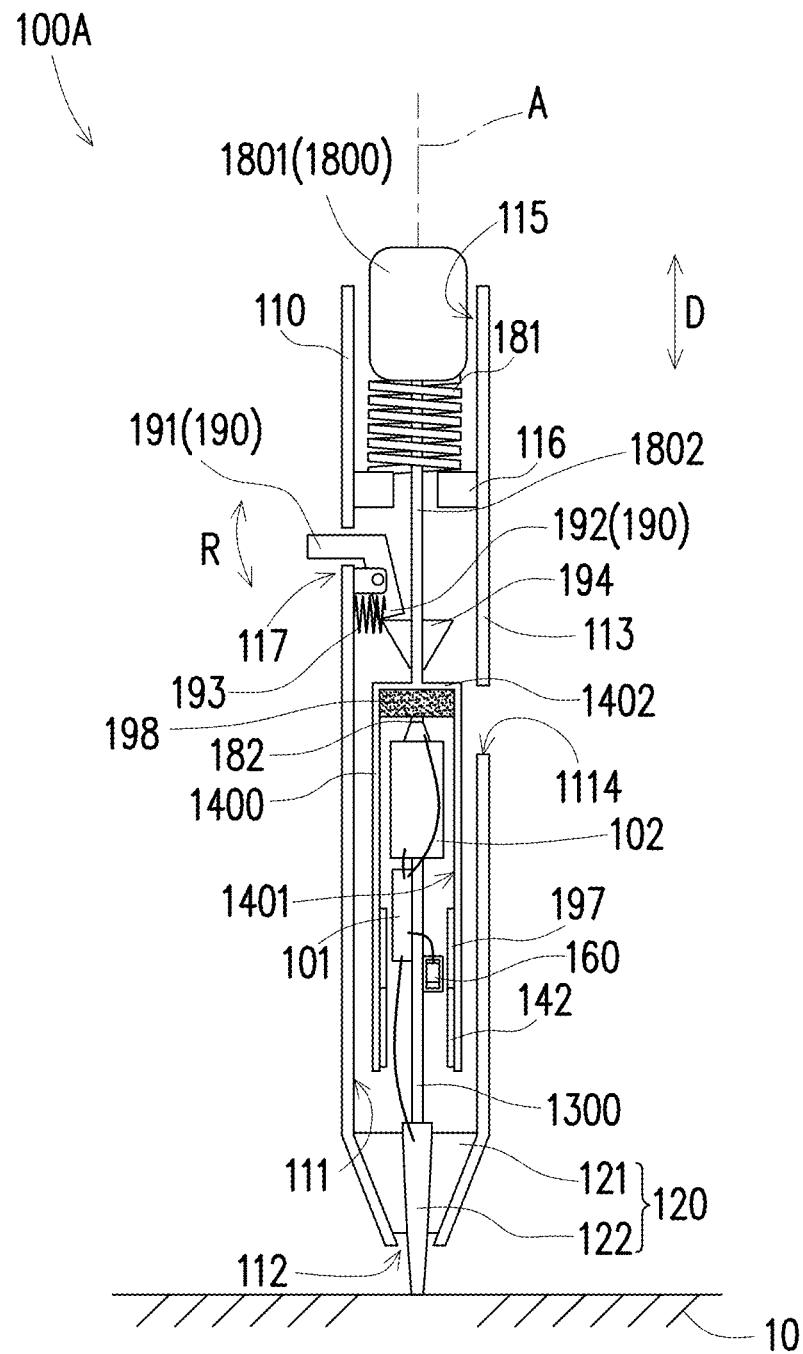
FIG. 2B is a structural schematic view of an active touch pen of the second embodiment of the invention under a second state.
Figure 2C:
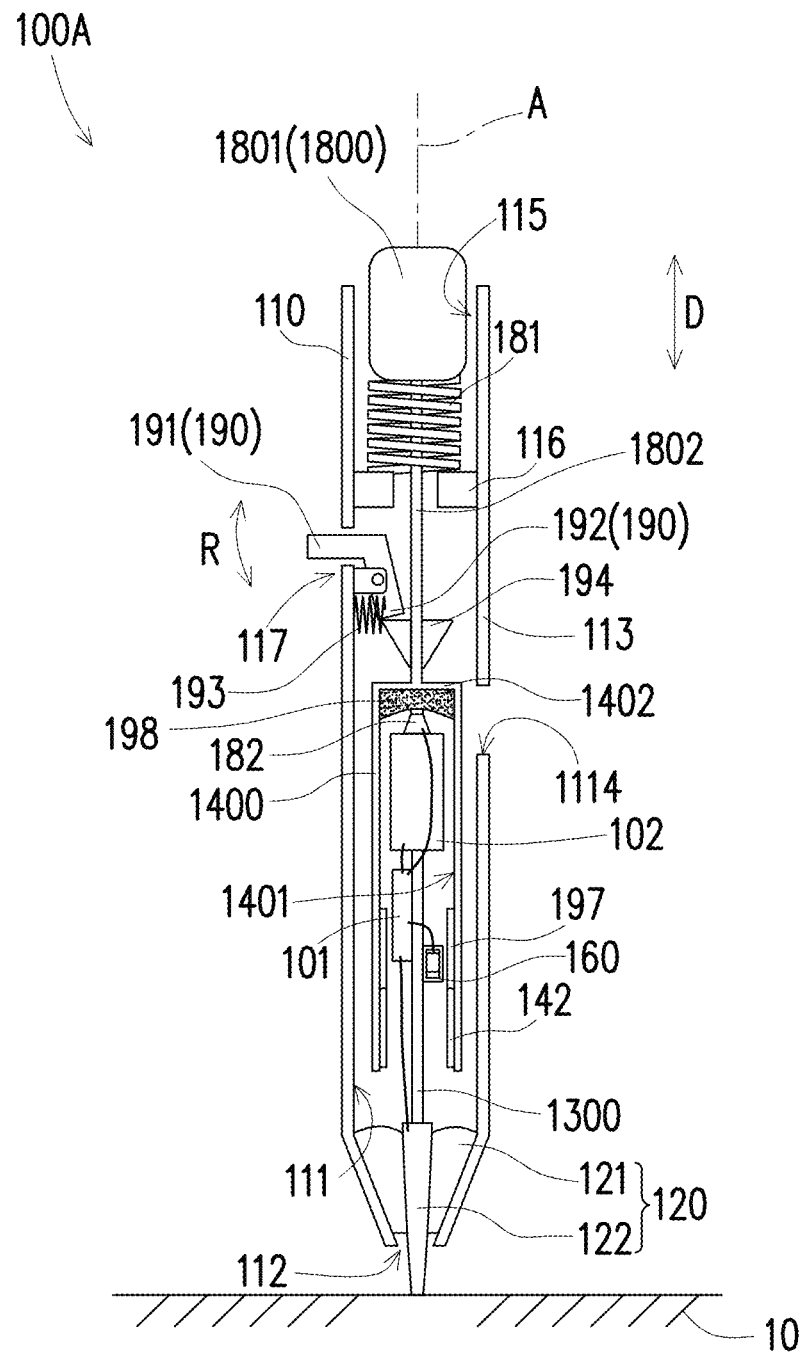
FIG. 2C is a structural schematic view of a pen head of FIG. 2B after being pressed.

FIG. 2A is a structural schematic view of an active touch pen of the second embodiment of the invention under a first state. FIG. 2B is a structural schematic view of an active touch pen of the second embodiment of the invention under a second state. FIG. 2C is a structural schematic view of a pen head of FIG. 2B after being pressed. Please refer to FIG. 2A to FIG. 2C, the differences between the active touch pen 100A of this embodiment and the active touch pen 100 of the first embodiment are illustrated as below: The pressing component 1800 of this embodiment includes a pressing portion 1801 and a shaft portion 1802, wherein at least a part of the pressing portion 1801 is exposed outside the pen barrel 110 for ease of user manipulation, and the pressing portion 1801 and the pen head 120 are respectively located at two opposite sides of the pen barrel 110. The shaft portion 1802 is located in the pen barrel 110, and two opposite sides of the shaft portion 1802 are respectively connected to the pressing portion 1801 and a top portion 1402 of the sleeve 1400. On the other hand, the shaft portion 1802 penetrates through the first elastic component 181, and two opposite ends of the first elastic component 181 are connected to the pressing portion 1801 and the block portion 116. The second restraint component 194 is connected to the shaft portion 1802, and is configured to move along with the shaft portion 1802 relative to the pen barrel 110.

Furthermore, the pressing component 1800 and the sleeve 1400 of this embodiment are connected to each other, and has the degree of freedom for moving back and forth along the moving direction D relative to the pen barrel 110. On the other hand, one end of the pen shaft 1300 is fixed on the pen head 120, while the other end of the pen shaft 1300 is configured with the switch 182, and the switch 182 is located between the pen shaft 1300 and the top portion 1402 of the sleeve 1400. For example, the top portion 1402 of the sleeve 1400 is configured with an elastomer 198, wherein the shaft portion 1802 and the elastomer 198 are respectively connected to two opposite sides of the top portion 1402, and the elastomer 198 is located between the top portion 1402 and the switch 182. The elastomer 198 can be made of silicon, rubber, or other deformable insulating materials.

In this embodiment, the first pattern 142 and the second pattern 197 are disposed in parallel on an inner surface 1401 of the sleeve 1400, and the first pattern 142 is located between the pen head 120 and the second pattern 197. That is, compared with the second pattern 197, the first pattern 142 is closer to the pen head 120. Under the first state illustrated in FIG. 2A, the sensor 160 is located in the sleeve 1400, and is aligned with the first pattern 142. At this time, the user can apply force to the part of the sleeve 140 exposed outside the second opening 114 so as to rotate the sleeve 1400 with respect to the Axis A relative to the pen barrel 110. When the sleeve 1400 rotates with respect to the Axis A relative to the pen barrel 110, the fixed sensor 160 is used to detect variation of the first pattern 142 so as to obtain the first sensing data, and transmits the first sensing data to the processor 150 (shown in FIG. 1B). After the processor 150 (shown in FIG. 1B) receives the first sensing data, the processor 150 (shown in FIG. 1B) calculates the rotation amount of the sleeve 140 according to the first sensing data and transmits to the touch display device 10 through the first wireless transmission element 171 (shown in FIG. 1B) so as to match with the software in the touch display device 10 to perform toning.

Then, the active touch pen 100 is converted to the second state illustrated in FIG. 2B. During this process, the pressing component 1800 and the sleeve 1400 move toward the pen head 120 relative to the pen barrel 110, and the top portion 1402 of the sleeve 1400 abuts against the switch 182 fixed on the pen shaft 1300 by the elastomer 198. After the switch 182 is triggered, the switch 182 transmits signals to the processor 150 (shown in FIG. 1B). Based on the said signals, the processor 150 (shown in FIG. 1B) transmits signals to the touch display device 10 through the first wireless transmission element 171 (shown in FIG. 1B) so as to complete color selection. Then, the user touches the touch display device 10 through the electromagnetic body 122, and slides on the touch display device 10 so as to match with the software in the touch display device 10, and writes or draws according to the selected color.

When the pressing component 180 is pressed, thus moves toward the pen head 120 relative to the pen barrel 110, the second restraint component 194 moves away from the block portion 116, and passes through the restraint portion 192. Furthermore, the restraint portion 192 is pushed by the second restraint component 194, such that the first restraint component 190 rotates, and that the second elastic component 193 is pushed by the restraint portion 192 and produces elastic deformation. After the second restraint component 194 moves through the restraint portion 192, the elastic restoring force of the second elastic component 193 drives the first restraint component 190 rotating to reset, such that the second restraint component 194 is abutted against the restraint portion 192. At this time, the active touch pen 100A is converted to the second state illustrated in FIG. 2B, wherein the first elastic component 181 is pushed by the pressing portion 1801 and produces elastic deformation. Also, the block portion 116 and the second restraint component 194 are respectively located at two opposite sides of the first restraint component 190. Since the second restraint component 194 and the restraint portion 192 are abutted against each other, the active touch pen 100A maintains the second state illustrated in FIG. 2B.

Under the second state illustrated in FIG. 2B, the second pattern 197 in the sleeve 1400 after moving is aligned with the sensor 160. When the user writes or draws in the touch display device 10 through the active touch pen 100A, the pressed-down pressure makes the elastomer 121 deform, such that the pen shaft 1300 moves relative to the pen barrel 110. During the sensor 160 moving the pen shaft 1300 relative to the pen barrel 110, the sensor 160 detects the variation of the second pattern 197 so as to obtain a second sensing data. The processor 150 (shown in FIG. 1B) calculates the pressure value when the pen head is pressed according to the second sensing data, and transmits to the touch display device 10 through the wireless transmission assembly 170 (shown in FIG. 1B) to dynamically adjust thickness of lines when writing or drawing according to the pressure pressed down by the user.

Figure 3A:
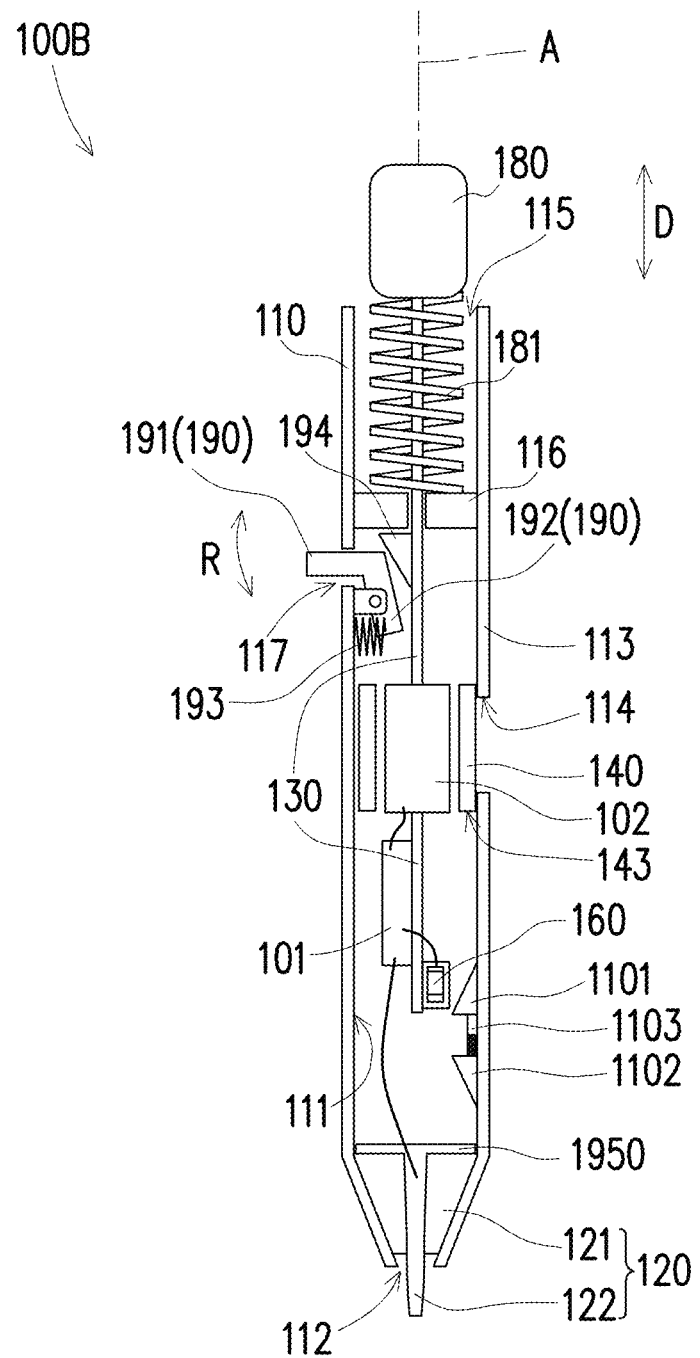
FIG. 3A is a structural schematic view of an active touch pen of the third embodiment of the invention under a first state.
Figure 3B:
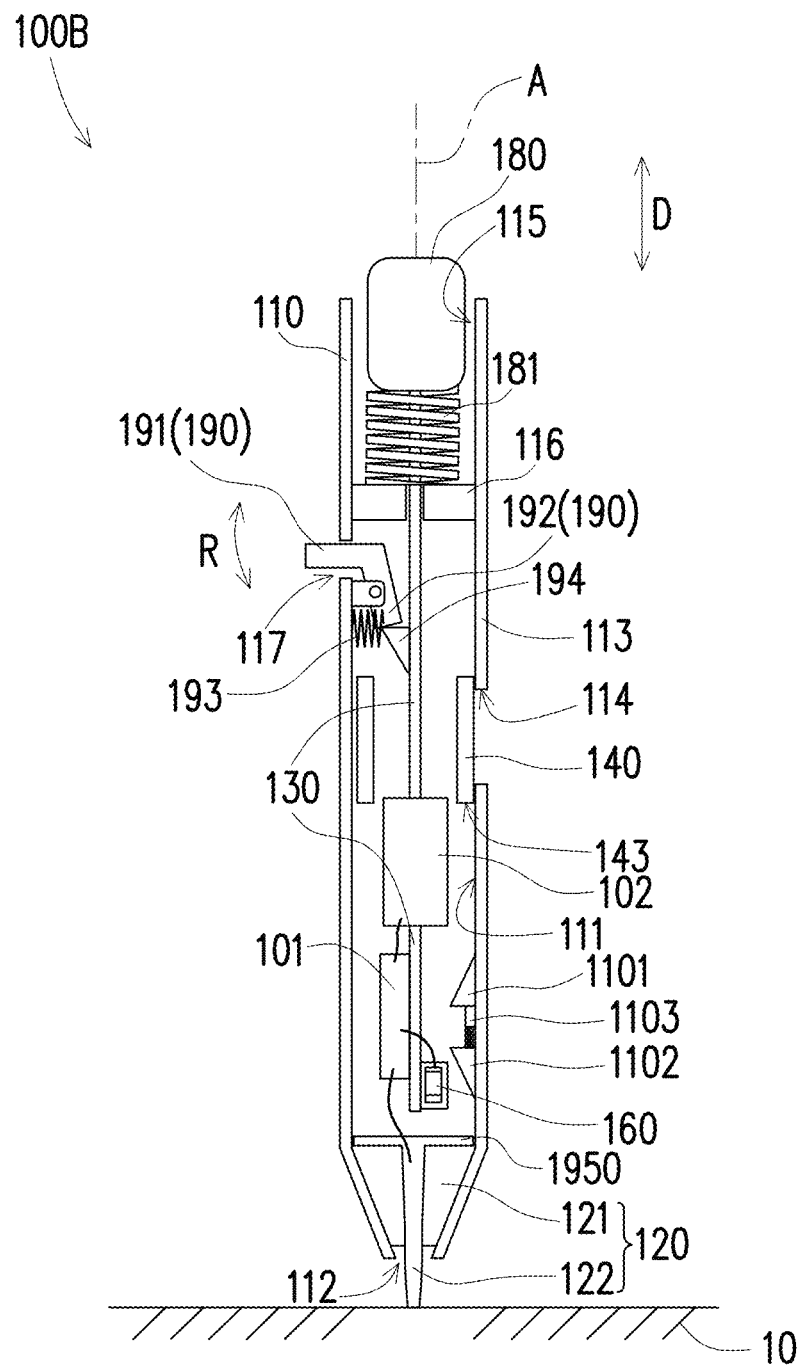
FIG. 3B is a structural schematic view of an active touch pen of the third embodiment of the invention under a second state.
Figure 3C:
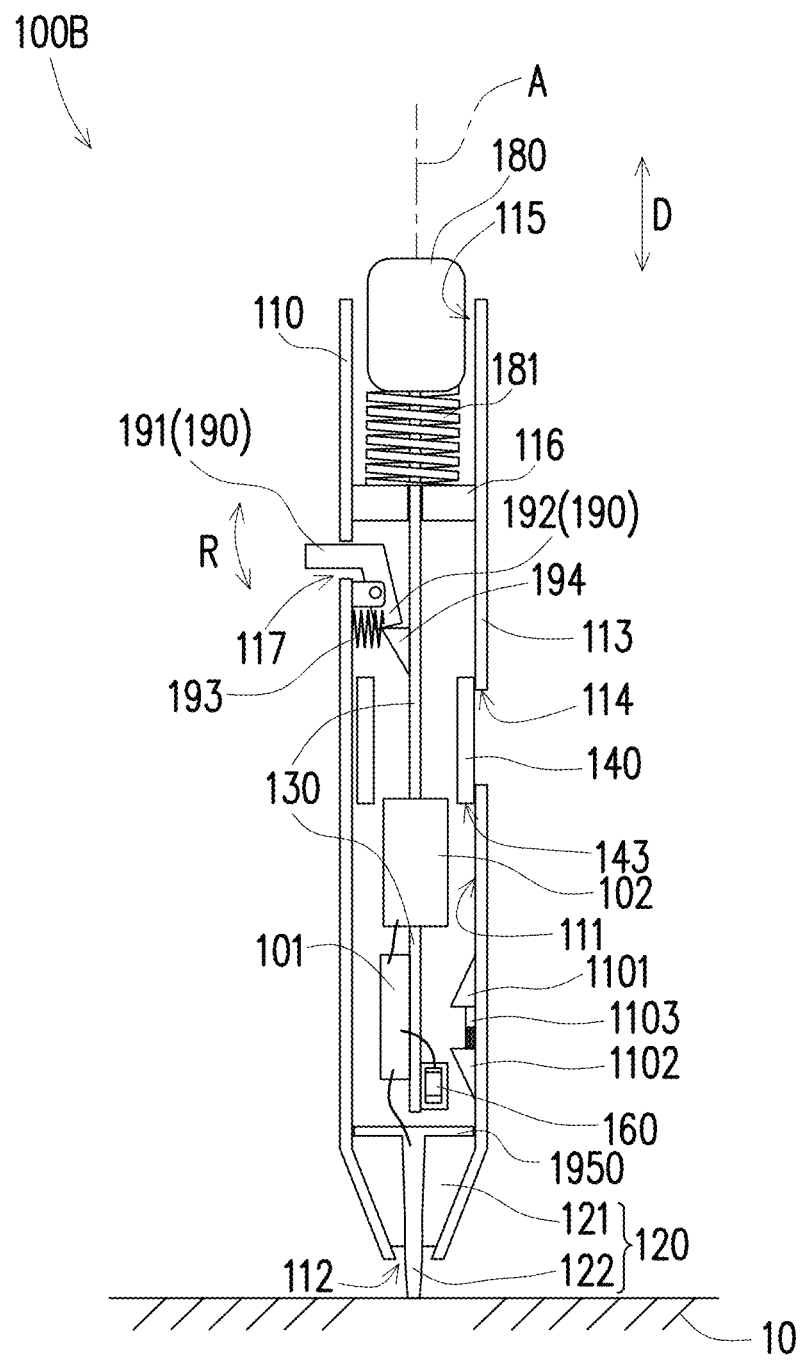
FIG. 3C and FIG. 3D are structural schematic views of a pen head of FIG. 3B after being pressed respectively.
Figure 3D:
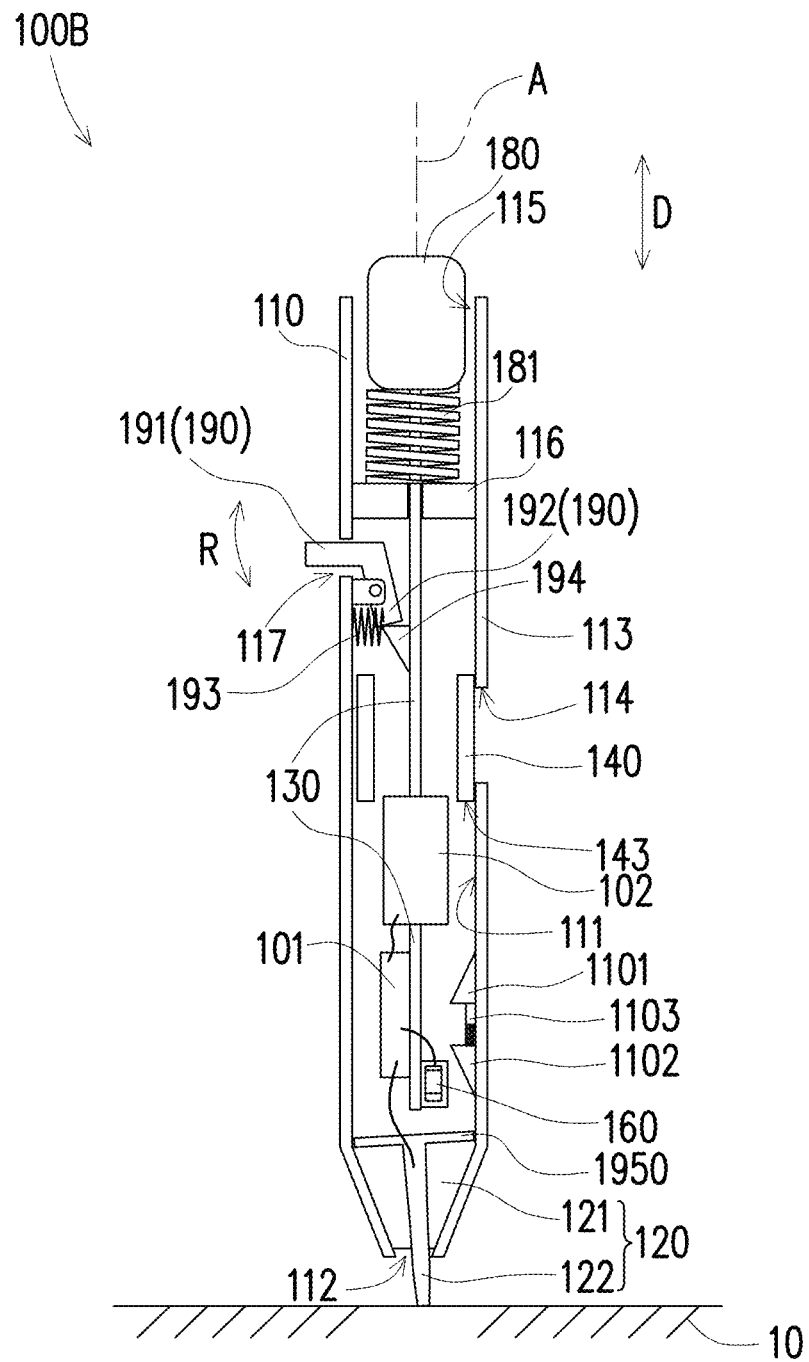
Figure 3E:
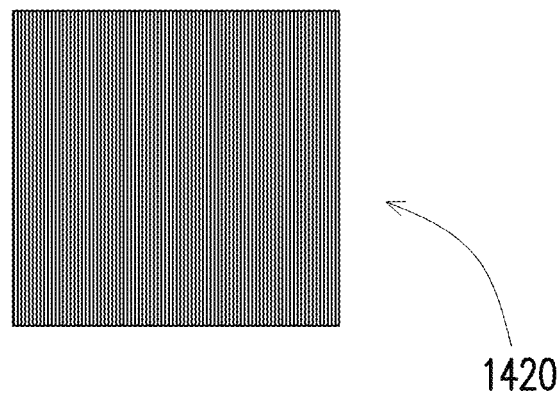
FIG. 3E is a schematic view of a first pattern reflected from a first reflector of FIG. 3A.
Figure 3F:
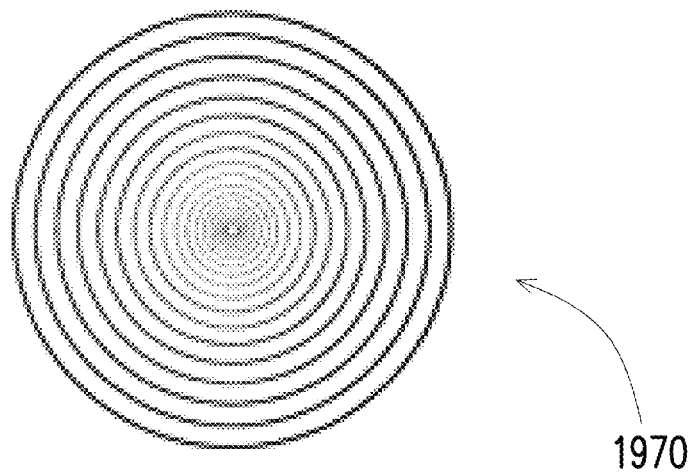
FIG. 3F is a schematic view of a second pattern in a linking component of FIG. 3A.

FIG. 3A is a structural schematic view of an active touch pen of the third embodiment of the invention under a first state. FIG. 3B is a structural schematic view of an active touch pen of the third embodiment of the invention under a second state. FIG. 3C and FIG. 3D are structural schematic views of a pen head of FIG. 3B after being pressed respectively. Please refer to FIGS. 3A to 3D, the differences between the active touch pen 100B of this embodiment and the active touch pen 100 of the first embodiment are illustrated as below: A bottom surface 143 of the sleeve 140 of this embodiment has the first pattern 1420 illustrated in 3E, wherein the inner surface 111 of the pen barrel 110 is configured with a first reflector 1101 and a second reflector 1102 disposed in parallel, and the first reflector 1101 and the pen head 120 are respectively located at two opposite sides of the second reflector 1102. The first reflector 1101 configured to reflect the first pattern 1420, and the reflected image of the first reflector 1101 is illustrated in FIG. 3E. On the other hand, the linking component 1950 is, for example, a round plate, and is connected to the elastomer 121 of the pen head 120. The linking component 1950 is located in the pen barrel 110, wherein one side of the linking component 1950 facing the pen shaft 130 has the second pattern 1970 illustrated in FIG. 3F, and the second reflector 1102 configured to reflect the second pattern 1970. The stripe alignment design of the second pattern 1970 illustrated in FIG. 3F is, for example, a plurality of concentric rings. In addition, the inner surface 111 of the pen barrel 110 is further configured with a switch pattern 1103, and the switch pattern 1103 is located between the first reflector 1101 and the second reflector 1102.

Under the first state illustrated in FIG. 3A, the sensor 160 is aligned with the first reflector 1101. At this time, the user can apply force to the part of the sleeve 140 exposed outside the second opening 114, such that the sleeve 140 rotates with respect to the Axis A relative to the pen barrel 110. When the sleeve 140 rotates with respect to the Axis A relative to the pen barrel 110, the fixed sensor 160 is used to detect image variation of the first pattern 1420 reflected from the first reflector 1101 so as to obtain the first sensing data, and transmit the first sensing data to the processor 150 (shown in FIG. 1B). After the processor 150 (shown in FIG. 1B) receives the first sensing data, the processor 150 (shown in FIG. 1B) calculates the rotation amount of the sleeve 140 according to the first sensing data and transmits to the touch display device 10 through the first wireless transmission element 171 (shown in FIG. 1B) so as to match with the software in the touch display device 10 to perform toning.

Then, the active touch pen 100 is converted to the second state illustrated in FIG. 3B. During this process, the pen shaft 130 moves toward the pen head 120 relative to the pen barrel 110, and the sensor 160 moves along with the pen shaft 130 through the switch pattern 1103, and stops moving until the sensor 160 is aligned with the second reflector 1102. For example, the switch pattern 1103 can be a combination of at least two contrastive patterns, such as a combination of black and white blocks. After the sensor 160 detects the switch pattern 1103, the sensor 160 transmits signals to the processor 150 (shown in FIG. 1B). Based on the said signals, the processor 150 (shown in FIG. 1B) transmits control signals to the touch display device 10 through the first wireless transmission element 171 (shown in FIG. 1B) so as to complete color selection. Then, the user touches the touch display device 10 through the electromagnetic body 122, and slides on the touch display device 10 so as to match with the software in the touch display device 10, and writes or draws according to the selected color.

Under the second state illustrated in FIG. 3B, the sensor 160 is aligned with the second reflector 1102. When the user writes or touches in the touch display device 10 through the active touch pen 100B, the pressed-down pressure makes the elastomer 121 deform, such that the linking component 195 produces up-and-down movements as illustrated in FIG. 3C or tilts and offsets as illustrated in FIG. 3D. During the linking component 195 producing up-and-down movements as illustrated in FIG. 3C or tilts and offsets as illustrated in FIG. 3D, the second pattern 1970 reflected from the second reflector 1102 is varied accordingly. Furthermore, the movement amount or the tilt and offset amount of the linking component 1950 affects the size of the second pattern 1970 reflected from the second reflector 1102. The sensor 160 detects the variation of the second pattern 1970 reflected from the second reflector 1102 so as to obtain a second sensing data. The processor 150 (shown in FIG. 1B) calculates the pressure value when the pen head is pressed according to the second sensing data, and transmits the pressure value to the touch display device 10 through the wireless transmission assembly 170 (shown in FIG. 1B) to dynamically adjust thickness of lines when writing or drawing according to the pressure pressed down by the user.

Figure 4A:
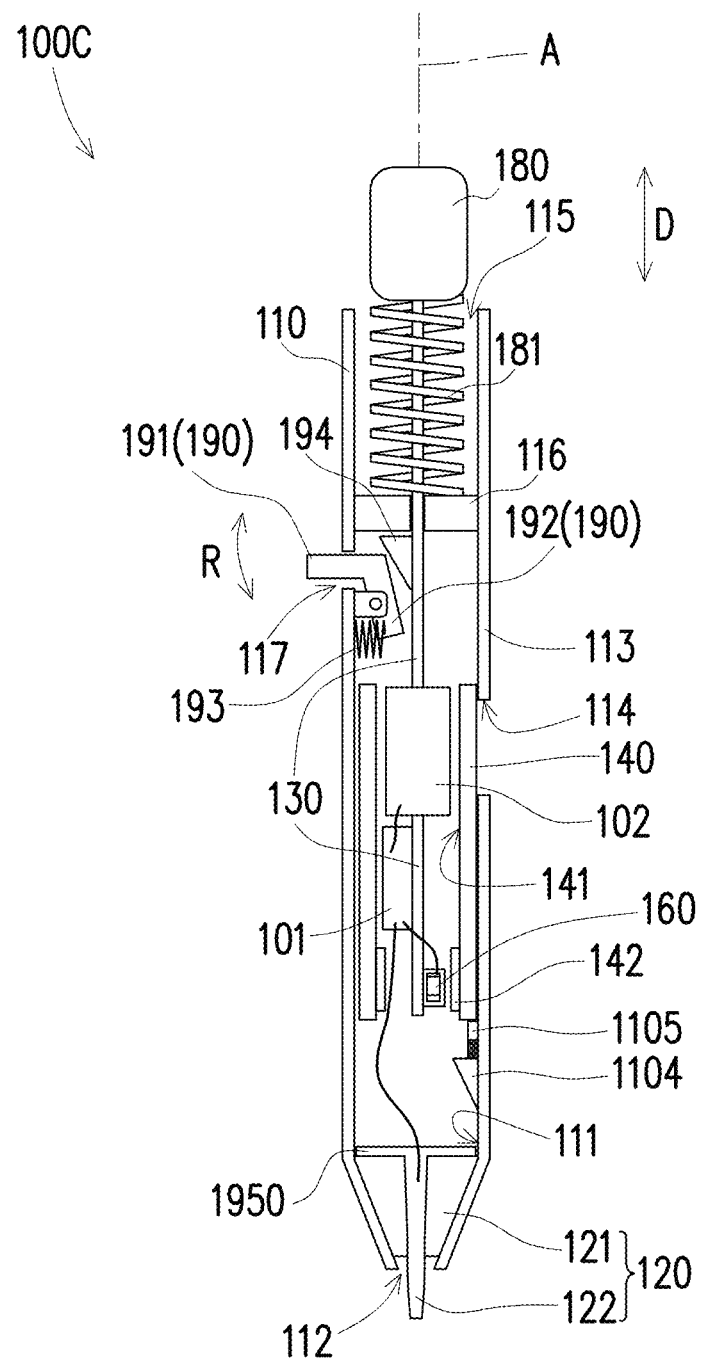
FIG. 4A is a structural schematic view of an active touch pen of the fourth embodiment of the invention under a first state.
Figure 4B:
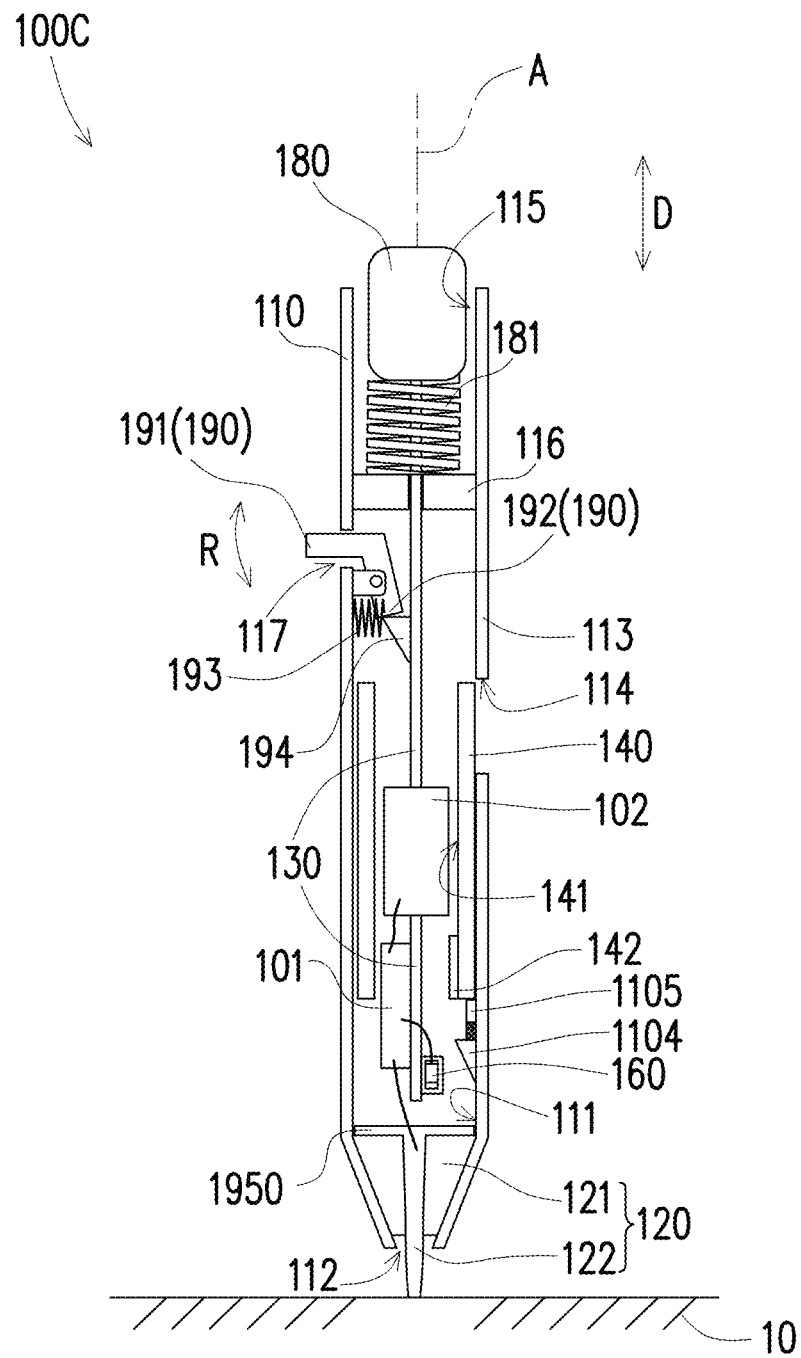
FIG. 4B is a structural schematic view of an active touch pen of the fourth embodiment of the invention under a second state.
Figure 4C:
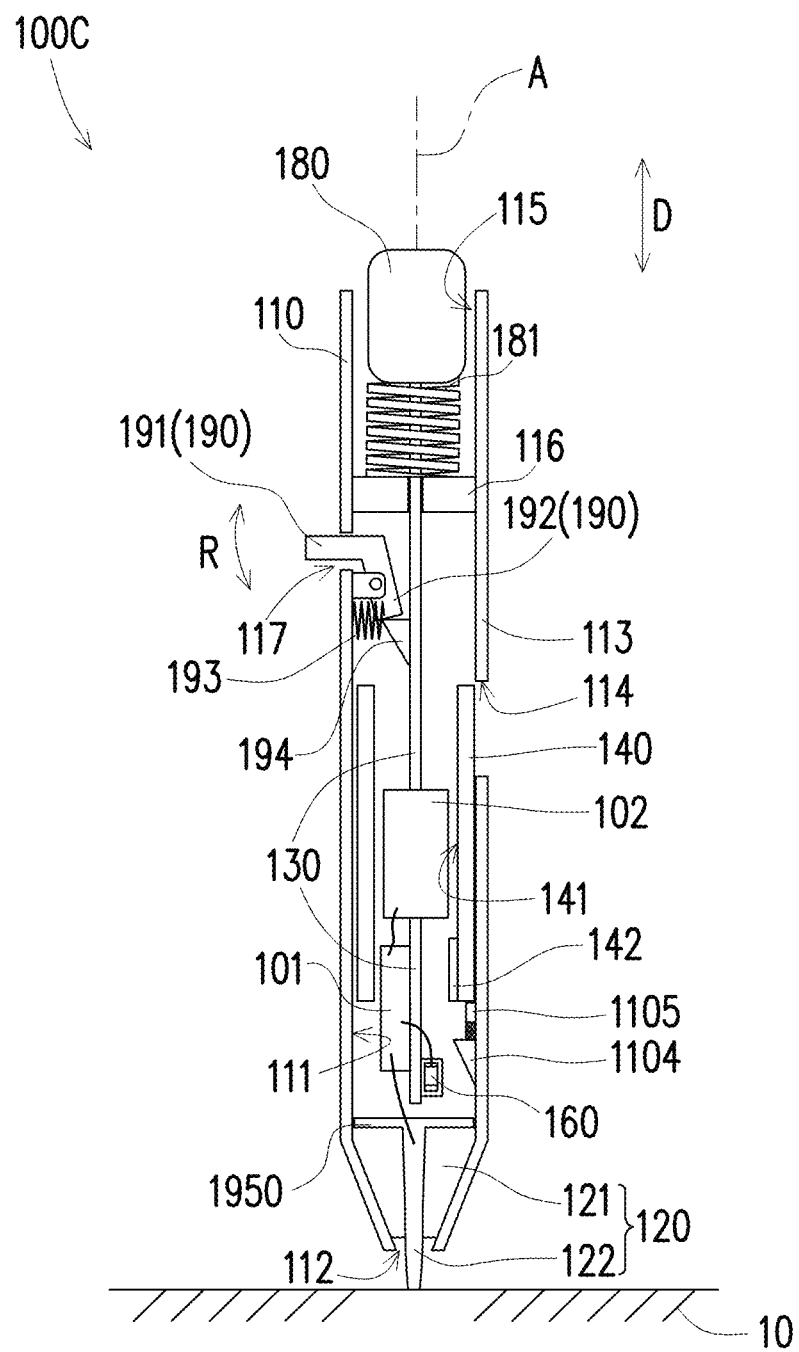
FIG. 4C and FIG. 4D are structural schematic views of a pen head of FIG. 4B after being pressed respectively.
Figure 4D:
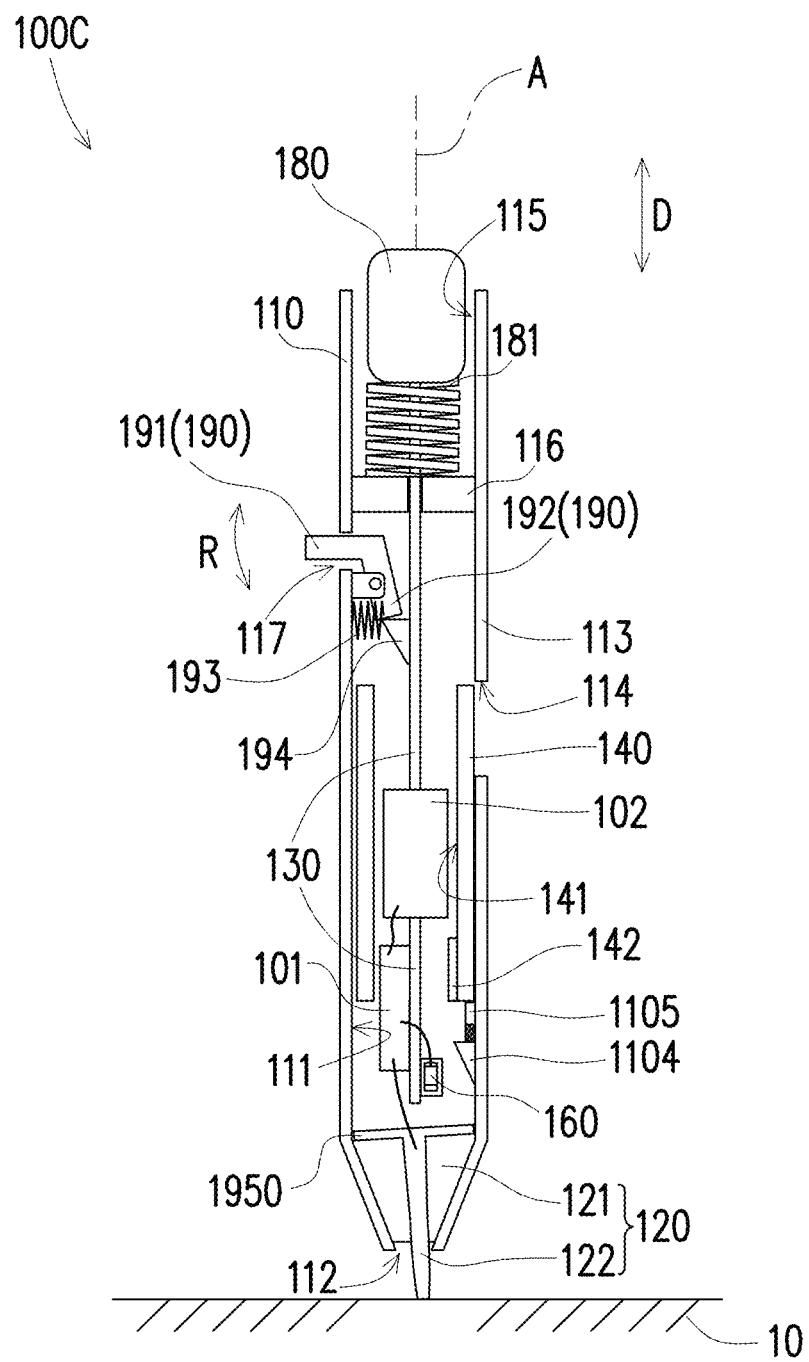

FIG. 4A is a structural schematic view of an active touch pen of the fourth embodiment of the invention under a first state. FIG. 4B is a structural schematic view of an active touch pen of the fourth embodiment of the invention under a second state. FIG. 4C and FIG. 4D are structural schematic views of a pen head of FIG. 4B after being pressed respectively. Please refer to FIGS. 4A to 4D. The differences between the active touch pen 100C of this embodiment and the active touch pen 100 of the first embodiment are illustrated as below: The inner surface 111 of the pen barrel 110 of this embodiment is configured with a reflector 1104 and a switch pattern 1105 disposed in parallel, and the first pattern 142 of the sleeve 140 and the reflector 1104 are respectively located at two opposite sides of the switch pattern 1105. The linking component 1950 is, for example, a round plate, and is connected to the elastomer 121 of the pen head 120. The linking component 1950 is located inside the pen barrel 110, wherein one side of the linking component 1950 facing the pen shaft 130 has the second pattern 1970, and the reflector 1104 is configured to reflect the second pattern 1970. The second pattern 1970 is, for example, a plurality of concentric rings, as illustrated in FIG. 3F.

Under the first state illustrated in FIG. 4A, the sensor 160 is aligned with the first pattern 142. At this time, the user can apply force to the part of the sleeve 140 exposed outside the second opening 114, such that the sleeve 140 rotates with respect to the Axis A relative to the pen barrel 110. When the sleeve 140 rotates with respect to the Axis A relative to the pen barrel 110, the fixed sensor 160 is used to detect variation of the first pattern 142 so as to obtain the first sensing data, and transmits the first sensing data to the processor 150 (shown in FIG. 1B). After the processor 150 (shown in FIG. 1B) receives the first sensing data, the processor 150 (shown in FIG. 1B) calculates rotation amount of the sleeve 140 according to the first sensing data and transmits the rotation amount to the touch display device 10 through the first wireless transmission element 171 (shown in FIG. 1B) so as to match with the software in the touch display device 10 to perform toning.

Then, the active touch pen 100 is converted to the second state illustrated in FIG. 4B. During this process, the pen shaft 130 moves toward the pen head 120 relative to the pen barrel 110, and the sensor 160 moves the pen shaft 130 through a switch pattern 1105, and stops moving until the sensor 160 is aligned with the reflector 1104. For example, the switch pattern 1105 can be a combination of at least two contrast pattern, such as a combination of black and white blocks. After the sensor 160 detects the switch pattern 1105, the sensor 160 sends signals to the processor 150 (shown in FIG. 1B). Based on the said signals, the processor 150 (shown in FIG. 1B) transmits control signal through the first wireless transmission element 171 (shown in FIG. 1B) to the touch display device 10 to complete the color selection. Then, the user can touch the touch display device 10 through the electromagnetic body 122, and slide on the touch display device 10 so as to match with the software in the touch display device 10, and write or draws according to the selected color.

Under the second state illustrated in FIG. 4B, the sensor 160 is aligned with the reflector 1104. When the users writes or draws in the touch display device 10 through the active touch pen 100C, the pressed-down pressure makes the elastomer 121 deform, such that the linking component 1950 produces up-and-down movements as illustrated in FIG. 4C or tilts and offsets as illustrated in FIG. 4D. During the linking component 1950 producing up-and-down movements as illustrated in FIG. 4C or tilts and offsets as illustrated in FIG. 4D, the second pattern 1970 reflected from the reflector 1104 is varied accordingly. Furthermore, the movement amount or the tilt and offset amount of the linking component 1950 affects the size of the second pattern 1970 reflected from the reflector 1104. The sensor 160 is used for detecting reflector 1104 the variation of the second pattern 1970 so as to obtain a second sensing data. The processor 150 (shown in FIG. 1B) calculates the pressure value when the pen head is pressed according to the second sensing data, and transmits the pressure value to the touch display device 10 through the wireless transmission assembly 170 (shown in FIG. 1B) to dynamically adjust thickness of lines when writing or drawing according to the pressure pressed down by the user.

In summary of the foregoing, the toning mechanism is integrated in the active touch pen of the invention. With the assistance of the sensor, the processor, and the wireless transmission assembly, the user only needs to rotate the sleeve so as to interact with the software in the touch display device, and to perform toning in the touch display device. Therefore, the active touch pen of the invention has great ease of use. Furthermore, under the first state, the sensor is configured to detect variation of the first pattern during the sleeve rotating relative to the pen barrel so as to obtain the first sensing data, and transmit the first sensing data to the processor. The processor calculates the rotation amount of the sleeve according to the first sensing data and transmits transmitting the rotation amount to the touch display device through the wireless transmission assembly to perform toning. Under the second state, the pen head is pressed, such that the sensor moves relative to the second pattern. At this time, the sensor is used to detect variation of the second pattern, so as to obtain a second sensing data. The processor calculates the pressure value when the pen head is pressed according to the second sensing data, and transmits the pressure value to the touch display device through the wireless transmission assembly to dynamically adjust thickness of lines when writing or drawing according to the pressure pressed down by the user.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. An active touch pen, used for manipulating a touch display device, the active touch pen comprising:
   a pen barrel;
   a pen head, connected to the pen barrel;
   a pen shaft, disposed in the pen barrel and connected to the pen head;
   a sleeve, disposed in the pen barrel, and the pen shaft penetrating through the sleeve, wherein the sleeve has an inner surface surrounding the pen shaft and a bottom surface facing the pen head, and the inner surface of the sleeve has a first pattern and a second pattern adjacent to the first pattern;

a processor, connected to the pen shaft;

a sensor, connected to the pen shaft and aligned with the first pattern, and electrically connected to the processor, the sensor being configured to detect variation of the first pattern during the sleeve rotating relative to the pen barrel so as to obtain a first sensing data, and transmits the first sensing data to the processor;

a wireless transmission assembly, connected to the pen shaft, and electrically connected to the processor, the processor calculating rotation amount of the sleeve according to the first sensing data and transmitting the rotation amount to the touch display device through the wireless transmission assembly to perform toning; and a switch, electrically connected to the processor, wherein the switch is connected to the pen shaft and is located between a top portion of the sleeve and the pen shaft, after the sleeve moves toward the pen head relative to the pen barrel, and the switch is thus triggered by the top portion of the sleeve, the sensor is aligned with the second pattern, and the processor controls the sensor to detect the variation of the second pattern during the pen shaft moving along with the pen head relative to the pen barrel so as to obtain the second sensing data, the processor calculates a pressure value when the pen head is pressed according to the second sensing data, and transmits the pressure value to the touch display device through the wireless transmission assembly to adjust thickness of lines.

2. The active touch pen according to claim 1, wherein the pen head comprises an elastomer and an electromagnetic body connected to the elastomer, and the elastomer is disposed in the pen barrel, wherein the electromagnetic body is electrically connected to the wireless transmission assembly, and at least a part of the electromagnetic body is exposed outside the pen barrel.

3. The active touch pen according to claim 1, further comprising:
   a pressing component, comprising a pressing portion and a shaft portion, wherein at least a part of the pressing portion is exposed outside the pen barrel, and the pressing portion and the pen head are respectively located at two opposite sides of the pen barrel, the shaft portion is located in the pen barrel, and two opposite ends of the shaft portion are respectively connected to the pressing portion and the top of the sleeve; and
   a first elastic component, disposed in the pen barrel, wherein the pen barrel configured with a block portion protruding therein, and the shaft portion penetrates through the first elastic component, and two opposite ends of the first elastic component are respectively connected to the pressing portion and the block portion.

4. The active touch pen according to claim 3, further comprising:
   a first restraint component, rotatably connected to the pen barrel, and the first restraint component and the first elastic component respectively located at two opposite sides of the block portion, wherein the first restraint component has a control portion and a restraint portion opposite to the control portion, the control portion is exposed outside the pen barrel, and the restraint portion is located in the pen barrel;
   a second elastic component, disposed in the pen barrel, and two opposite ends of the second elastic component being respectively connected to the pen barrel and the restraint portion; and
   a second restraint component, connected to the pen shaft, and configured to move along with the pressing component relative to the pen barrel, when the pressing component being pressed and moving toward the pen head relative to the pen barrel, the first elastic component being compressed, the second restraint component moving away from the block portion and abutting against with the block portion.

* * * * *